(12) United States Patent
Carter, Jr. et al.

(10) Patent No.: US 8,739,679 B2
(45) Date of Patent: Jun. 3, 2014

(54) APPARATUS TO ELIMINATE BACK DRIVE IN PUSH PULL SYSTEM OF ROTOR AIRCRAFT AND RELATED METHODS

(75) Inventors: Jay W. Carter, Jr., Burkburnett, TX (US); M. Keith Robinson, Wichita Falls, TX (US); Jeffrey R. Lewis, Wichita Falls, TX (US)

(73) Assignee: Carter Aviation Technologies, LLC, Wichita Falls, TX (US)

( * ) Notice: Subject to any disclaimer, the term of this patent is extended or adjusted under 35 U.S.C. 154(b) by 155 days.

(21) Appl. No.: 13/532,213

(22) Filed: Jun. 25, 2012

(65) Prior Publication Data
US 2012/0325340 A1    Dec. 27, 2012

Related U.S. Application Data

(60) Provisional application No. 61/501,045, filed on Jun. 24, 2011.

(51) Int. Cl.
*B64C 13/00* (2006.01)
*F15B 7/00* (2006.01)

(52) U.S. Cl.
USPC ............................ 91/364; 91/437; 244/17.25

(58) Field of Classification Search
CPC .... B64C 27/001; B64C 27/024; B64C 13/04; B64C 13/28
USPC .................. 60/592; 91/358 R, 364, 435, 437; 92/181 R, 135; 244/17.13, 17.25
See application file for complete search history.

(56) References Cited

U.S. PATENT DOCUMENTS

| | | | | |
|---|---|---|---|---|
| 2,069,605 A | * | 2/1937 | Fischel | 91/364 |
| 2,385,351 A | * | 9/1945 | Davidsen | 91/438 |
| 3,002,569 A | | 10/1961 | Doblhoff | |
| 3,738,594 A | | 6/1973 | Donovan et al. | |
| 4,258,890 A | * | 3/1981 | Korkosz | 244/223 |
| 5,947,000 A | * | 9/1999 | Kazumori et al. | 91/378 |
| 6,405,980 B1 | | 6/2002 | Carter, Jr. | |
| 7,137,591 B2 | | 11/2006 | Carter et al. | |
| 7,510,377 B1 | | 3/2009 | Carter, Jr. et al. | |
| 7,677,492 B1 | * | 3/2010 | Carter et al. | 244/17.25 |
| 2005/0116095 A1 | | 6/2005 | Cline et al. | |

OTHER PUBLICATIONS

International Search Report and Written Opinion for PCT Application No. PCT/US2012/044047, dated Sep. 6, 2012 (11 pages).

* cited by examiner

*Primary Examiner* — Thomas E Lazo
(74) *Attorney, Agent, or Firm* — Gardere Wynne Sewell LLP

(57) ABSTRACT

Apparatus and methods for eliminating back drive in a push pull type control system, are provided. An exemplary apparatus includes a control rod including a pair of spaced apart piston displacement members each configured to carry a check valve. The apparatus also includes a pair of opposite-face check valves each configured to seal against respective opposing face of a piston head to form a hydraulic lock, preventing back drive in the control system.

20 Claims, 2 Drawing Sheets

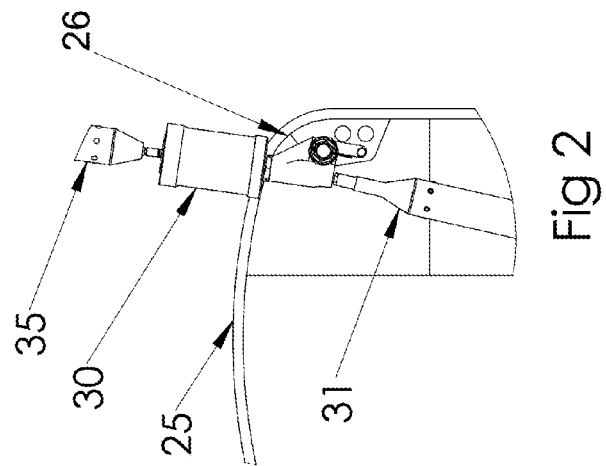
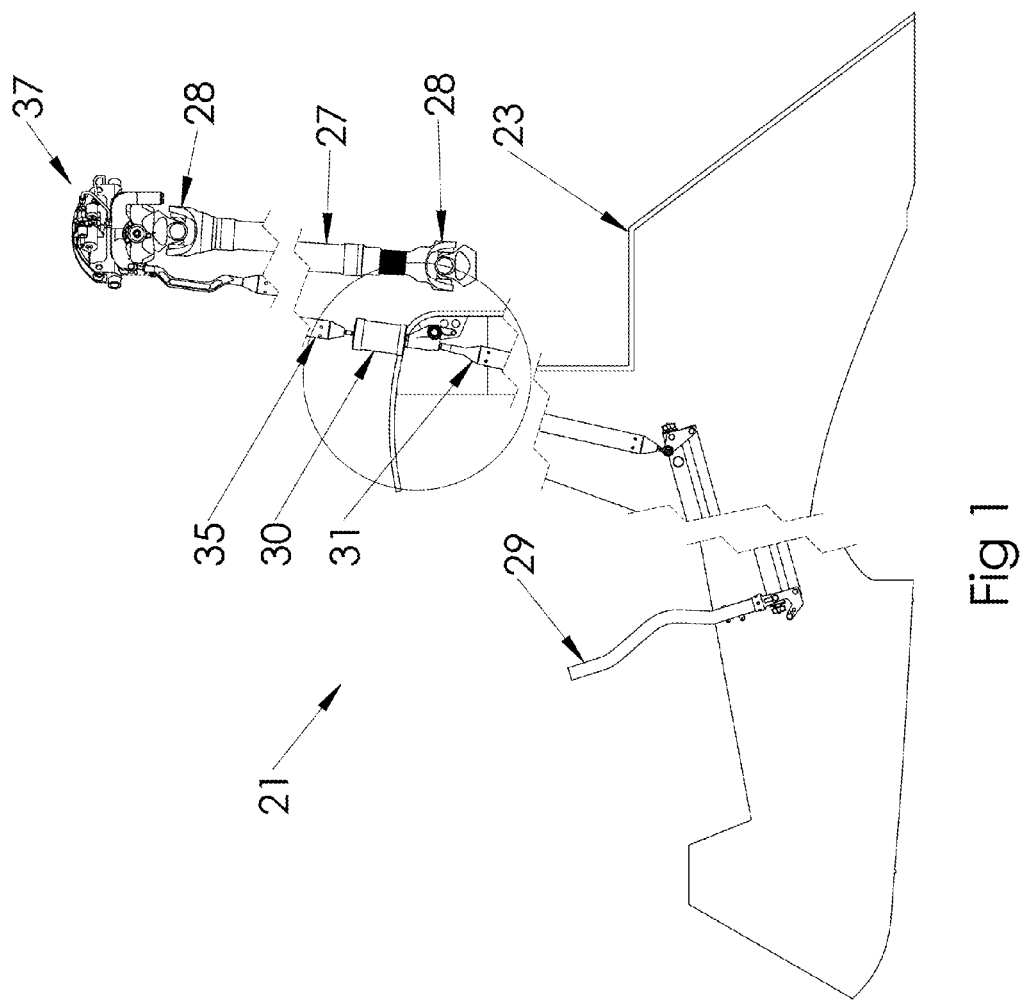

APPARATUS TO ELIMINATE BACK DRIVE IN PUSH PULL SYSTEM OF ROTOR AIRCRAFT AND RELATED METHODS

RELATED APPLICATIONS

This application is a non-provisional patent application of and claims priority to and the benefit of U.S. Patent Application No. 61/501,045, filed on Jun. 24, 2011, titled "Hydraulic Cylinder to Eliminate Back Drive in Push Pull System of Rotor Aircraft," incorporated by reference in its entirety.

BACKGROUND OF THE INVENTION

1. Field of the Invention

This invention relates in general to rotor aircraft, such as gyro planes, and in particular to the manual control systems, and more specifically to apparatus and methods for eliminating back drive in a push pull type system/assembly for a vehicle.

2. Description of the Related Art

Certain types of rotor wing aircraft such as gyro planes utilize, for example, a tiltrotor concept, which typically does not employ a swash plate to translate control inputs to the rotor disk and/or a hydraulic boost system. Rather, such flight control design directly manipulates the supporting rotor control head, itself, along both the pitch and roll axes.

During prerotation, the rotor of such a gyro plane is driven by a drive shaft that has a U-joint at either end. The U-joints are generally considered necessary, as the rotor must have freedom of movement to control the aircraft. However, when the U-joints are not perfectly aligned, this out of alignment condition creates a "kick" load that is fed into the flight control system and generally must be reacted by the controls. Ultimately, this "back drive" is felt, and must be reacted to, by the pilot using the control stick. Further, as the U-joints become more misaligned, the kick load amplitude can become so large that the flight control system becomes unstable. During a test of a recent prototype gyro plane, the pilot was able to maintain the stick in the proper position up to around 200 rpm, or 80% of the flight rpm. Above that rpm, the kick load amplitude became too large for the pilot to maintain the control stick in a stable position. Accordingly, recognized by the inventors is the need for an apparatus and methods for eliminating uncontrollable back drive in a flight control or other type of similarly configured machine//vehicle control system.

Similarly, during cruise flight, at some advance ratio (aircraft speed/rotor tip speed), the rotor will become unstable. Accordingly, further recognized is the need for an apparatus and methods that allow the pilot to maintain control of the rotor even when the rotor system is unstable during cruise flight.

SUMMARY OF THE INVENTION

In view of the foregoing, various embodiments of the present invention advantageously provide apparatus and methods for eliminating back drive in a flight control or other type of similarly configured machine or control system. Various embodiments of the present invention control otherwise uncontrollable back drive in a flight control system in both prerotation and during unstable rotor conditions during flight.

Although it is recognized that the torque/kick issue during prerotation could at least partially be addressed with a swash plate design like that used in helicopters, the various embodiments of the present invention can advantageously allow for the use of a simpler tilting spindle rotor control, which can also be designed more compactly for improved aerodynamic efficiency. Additionally, a hydraulic boost system could also be used to automatically overcome high control stick loads. The hydraulic system, however, requires a hydraulic pump and is an active system, adding additional weight and an additional level of complication to the flight control system. Various embodiments of the present invention advantageously provide a simpler and passive structure for overcoming the torque/kick issue.

More specifically, an example of an embodiment of an apparatus for eliminating back drive in a push pull type control system includes an input control rod including a rod end assembly carrying a pair of spaced apart piston displacement plates or other members. The first of the pair of piston displacement members is located within a piston chamber and a second of the pair of piston engagement members is located outside the piston chamber. Each piston displacement member includes at least one, but more typically a plurality of check valve apertures each configured to receive a check valve. The apparatus can also include a piston contained within a, e.g., cylindrical shaped housing containing hydraulic fluid. The piston includes a piston head and a piston body having inner surface portions defining the piston chamber, which is configured to receive some of the hydraulic fluid contained within the housing. The piston head can include a first aperture for slidably extending through a portion of the control rod and a second aperture for passing portions of the hydraulic fluid into the piston chamber and for passing portions of the hydraulic fluid out of the piston chamber.

A first check valve of a pair of opposite-facing check valves is connected to the first of the pair of piston displacement members and a second check valve of the pair of opposite-facing check valves is connected to the second of the pair of piston displacement members. Each check valve has an aperture extending through a piston-facing surface of the respective check valve for receiving hydraulic fluid. The body of the first check valve is oriented so that when the first of the pair of piston displacement members is retracted into a direction of the piston head and the piston-facing surface of the first check valve lands upon an opposing surface of the piston head, the aperture of the first check valve forms an at least substantially, but preferably a fully sealed pathway through the second aperture in the piston head. Similarly, the body of the second check valve is oriented so that when the second of the pair of piston displacement members is extended into a direction of the piston head and the piston-facing surface of the second check valve lands upon an opposing surface of the piston head, the aperture in the second check valve forms an at least substantially, but preferably a fully pathway through the second aperture in the piston head. According to an embodiment, the first and the second check valves are separated a sufficient distance so that when the respective piston-facing surface of one of the pair of opposite-facing check valves is in sealing contact with the piston head, the piston-facing surface of the other of the pair of opposite-facing check valves is separated from the piston head.

According to an embodiment, the piston head and the first and the second check valves are complementarily configured. For example, according to such embodiment, when the piston encounters forces emanating from an object to be controlled (e.g., rotor control head) that causes the piston to retract in the direction of the piston-facing surface of the first check valve and the corresponding opposing surface of the piston head sealingly engages the piston-facing surface of the first check valve, the sealing engagement of the opposing surface of the piston head with the first check valve causes a hydraulic lock that prevents further refraction of the piston head, thereby preventing back drive of the object to be controlled. Similarly, when the piston encounters forces emanating from the object to be controlled that causes the piston to extend in the direction of the piston-facing surface of the second check valve and the corresponding opposing surface of the piston head sealingly engages the piston-facing surface of the second check valve, the sealing engagement of the opposing surface of the piston head with the second check valve causes a hydraulic lock that prevents further extension of the piston head, thereby preventing back drive of the object to be controlled.

In order to provide control system feedback to the user, according to an embodiment, a pair of centering springs can be positioned to maintain the piston between the pair of opposite-facing check valves so that when no substantial (or excessive) external forces are applied to the piston or to the control rod, hydraulic fluid can flow into and out of the piston chamber through the second aperture of the piston head, effectively bypassing the check valves. A first of the pair of centering springs extend between a piston-facing outer surface portion of first piston displacement member and an opposing distal-facing outer surface portion of the piston head. A second of the pair of centering springs extend between a piston-facing outer surface portion of the second piston displacement member and a proximal-facing outer surface portion of the piston head.

According to an embodiment, the piston head includes at least a third aperture and fourth aperture for receiving one or more pairs of pressure relief valves. A first pressure relief valve of the pair of pressure relief valves includes a body slidably extending through the third aperture and is connected to the second of the pair of piston displacement members. A second pressure relief valve of the pair of pressure relief valves includes a body slidably extending through the fourth aperture and is connected to the first of the pair of piston displacement members. The second pressure relief valve is oriented to function in an opposite direction than that of the first pressure relief valve. As such, the first and the second pressure relief valves are together configured to prevent excessive pressure buildup on both the first (distal) and second (proximal) facing sides of the piston head, which could result in a catastrophic failure of the apparatus. Additionally, the pressure relief settings can be set to relieve pressure at a low enough value to provide feedback to the pilot or other user that the operating conditions are excessive, in order to give the user enough lead to adjust the operating conditions.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 1 is a perspective partially environmental view of an apparatus for eliminating back drive in a push pull type flight control system for an aircraft according to an embodiment of the present invention;

FIG. 2 is a large view of the apparatus and surrounding environment FIG. 1.

DETAILED DESCRIPTION

Figures 3, 4:
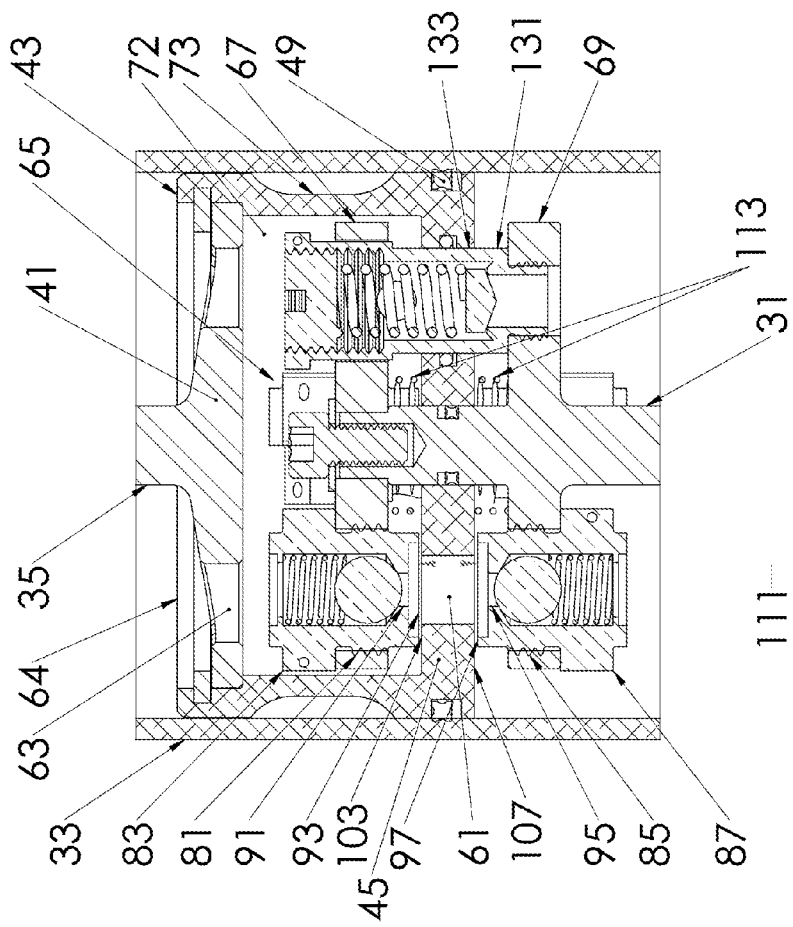
FIG. 3 is a sectional view of specific components of the apparatus according to an embodiment of the present invention.
FIG. 4 is an enlarged view of a portion of the apparatus of FIG. 3.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention provide apparatus and methods that can eliminate back drive in a push pull type system. That is, one or more embodiments can allow a push pull system to move in the direction that a user desires, but will prevent object being controlled from moving the push pull system in a direction not initiated by the user.

Referring to FIGS. 1 and 2, a specific application of such embodiment is in a flight control system 21 of a gyro plane 23. In this application, apparatus 30 shown rigidly connected to a portion of the fuselage 25 via a mounting bracket 26, has two primary functions. The first is during prerotation of a rotor (not shown). During prerotation, the rotor is driven by a drive shaft 27 that has a U-joint 28 at either end. When the U-joint(s) 28 isn't/aren't perfectly aligned, the respective U-joint or joints 28 create a 'kick' load that can only be reacted by the flight controls, which ultimately means at the control stick 29. Additionally, the flight control system can become unstable, since the kick load gets higher the more out of alignment the U-joint becomes. The apparatus 30 can carry that kick load caused by misalignment of driveshaft U-joints during prerotation of the rotor so that the pilot doesn't have to—allowing the rotor to prerotate the aircraft rotor to the desired rpm.

The second primary application is for high speed flight, when the rotor is slowed. At some advance ratio (aircraft speed/rotor tip speed), the rotor will go unstable. The apparatus 30 can allow the pilot to maintain control of the rotor even when it is not unstable.

Referring to FIG. 3, the user input to the apparatus 30 is an input control rod 31 protruding below the cylinder shaped housing 33. An output control rod 35 protruding above the housing 33 extends to the object to be controlled. In the exemplary embodiment, the object to be controlled is a rotor control head 37 (FIG. 1) supporting a set of one or more rotor blades (not shown). The threaded lower portion 39 of the housing 33 is anchored to a solid restraint 25, 26 (FIG. 1) to react feedback forces.

Referring also to FIG. 4, the head 41 of output control rod 35 is directly attached to or integral with a piston 43 having a piston head/face 45 located within a cylindrical housing chamber 47 of the cylindrical housing 33. The body and/or head of the piston 43 includes an annular seal 49, which functionally divides the chamber 47 to functionally separate chambers 51, 52 (i.e., input and output chambers). Similarly, the lower and upper end portions 53, 55, of the cylindrical housing 33 each also include at least one annular seal 57, 59, to contain the hydraulic fluid within the housing chamber 47.

The piston head 45 contains at least one, but typically a plurality of ports (apertures) 61 through which hydraulic fluid can flow. There are also ports (apertures) 63 extending through the output side 64 of the piston 43 (i.e., piston tail 64). Part of a rod-end assembly 65 projects through the piston head 45 of the piston 43. The rod end assembly 65 includes a pair of spaced apart piston displacement plates or other members 67, 69, located on either side of the piston head 45. The input control rod 31, extending through the input side 53 of the housing 33 is attached to or integral with the rod end assembly 65. The piston displacement plates 67, 69, are correspondingly attached to or integral with the input control rod 31. In the exemplary embodiment, a fastener 71 connects the piston displacement plate 67 within a piston chamber 72 defined by the piston head 45, the piston tail 64, and a main body portion 73, and the piston displacement plate 69 is integral with the input control rod 31.

The piston displacement plate 67 includes at least one but more typically a plurality of check valve apertures 81 (only one shown) each configured to support a corresponding check valve 83. Similarly, the piston displacement plate 69 includes at least one but more typically a plurality of a check valve apertures 85 (only one shown) each configured to support a corresponding check valve 87. Each complementing pair of the check valves 83, 87 are aligned with one of the ports 61 in the piston. The first check valve 83 includes an aperture 91 extending through a piston-facing surface 93 of the check valve 83 to receive hydraulic fluid. The second (opposing) check valve 87 includes an aperture 95 extending through a piston-facing surface 97 of the second check valve 87.

The body of the first check valve 83 is oriented so that when the piston displacement plate 67 is retracted into a direction of the piston head 45 and the piston-facing surface 93 of the first check valve 83 lands upon an opposing surface 103 of the piston head 45, the aperture 91 of the first check valve 83 forms a sealed pathway through the aperture 61 in the piston head 45. Similarly, the body of the second check valve 87 is oriented so that when the piston displacement plate 69 is extended into a direction of the piston head 45 and the piston-facing surface 97 of the second check valve 87 lands upon an opposing surface 107 of the piston head 45, the aperture 95 of the second check valve 87 forms a sealed pathway through the aperture 61 in the piston head 45.

According to the exemplary configuration, a small amount of relative movement can occur between the input and output sides of the piston head 45, as defined by relative thickness of the piston head 45 and a gap 111 between the check valves 83, 87. In operation, when the output control rod 35/head 41 moves relative to the input control rod 31, one of the check valves 83, 87, may contact the piston head 45 and seal against the respective opposing surface 103, 107. Note, according to the exemplary embodiment, a useful but optional feature shown in FIG. 4 is a pair of springs 113 positioned to maintain the piston head 45 centered between the check valves 83, 87.

To understand how the apparatus 30 eliminates back drive, consider the specific example of the output control rod 35 trying to drive the piston 43 upward while the user holds the input control rod 31 stationary. The piston head 45 will move upward until it seats against the check valve(s) 83. Because of the orientation of the check valve(s) 83, the hydraulic fluid will not be able to flow through them in the direction that would allow the piston 43 to continue moving upward. The piston 43 will be hydraulically locked and the piston 43, output control rod 35, and rotor control head 37 will not able to move any further. Similarly, if the output control rod 35 is trying to drive the piston 43 downward while the user holds the input control rod 31 stationary, the piston head 45 will move downward until it seats against the check valve(s) 87. Because of the orientation of the check valve(s) 87, the hydraulic fluid will not be able to flow through them in the direction that would allow the piston 43 to continue moving downward. The piston 43 will be hydraulically locked and the piston 43, output control rod 35, and rotor control head 37 will not be able to move any further.

If the user wishes to move the rotor control head 37, there are two possibilities. The first is that the user attempts to move the input control rod 31 in the same direction that the output control rod 35 is trying to drive the piston 43. Even if the piston head 45 is initially sealed against one of the check valves 83, 87, before the user attempts to move the input control rod 31, the inertia of the flight control system 23 will allow the user to push the input side far enough to open a gap between the piston head 45 and the check valves 83 or 87, depending upon the desired direction, allowing the flight controls and rotor control head 37 to move in the desired direction.

The other possibility is that the user attempts to move the input control rod 31 in the opposite direction than the output control rod 35 is trying to drive the piston 43. As an example, consider that, as above, the output control rod 35 is trying to drive the piston 43 upward, but this time the user is attempting to move the input control rod 31 downward. The piston head 45 will still be seated against the check valves 83. If the user can apply a force greater than that being applied at the output control rod 35, the check valve(s) 83, due to their orientation, will allow hydraulic fluid to flow from the lower chamber 51 of cylindrical shaped housing 33 to the upper chamber 52 (see FIG. 3), allowing the piston 43 to move downward. If the user cannot apply a force greater than that being applied at the output control rod 35, the piston 43 will remain stationary.

According to the exemplary embodiment, the optional springs 113 shown landed upon the piston head 45, in between each of the plates 67, 69, can be employed to provide a smoother motion and tactile feedback when the feedback forces from the output 41 are relatively low. The springs 113 function to keep the piston head 45 centered between the check valves 83, 87, allowing hydraulic fluid to bypass the check valves 83, 87, to flow through the ports 61 in the piston head 45. When the fluid can bypass the check valves 83, 87, the piston 43 is free to move in either direction, with no 'jerkiness' due to the piston head 45 sealing then separating from the check valves 83, 87. In this mode of operation, feedback forces from the output control rod 35 are communicated to the input control rod 31. Therefore, the springs 113 must be sized appropriately such that at a predetermined unit size dependent threshold feedback force, the spring forces will be overcome and the flight control system will operate as described above to eliminate back drive.

Another optional feature shown in the FIG. 3, is the reservoir 121 in combination with a micron scale filter 123. This configuration is useful when the feedback forces will vary with a relatively high frequency. The micron scale filter 123, while not forming a perfect seal, causes such a high pressure drop in the chamber 47 that the flight control system will not be able to move very quickly, while still allowing air bubbles to escape the chamber 47 into the reservoir 121.

Referring again to FIG. 4, a third optional feature are a set of pressure relief valves 131 (only one shown) extending through a corresponding set of apertures 133 in the piston head 45, and e.g., threadingly connected to one of the piston engagement plates 67, 69. Each pair of pressure relief valve 131 is oriented in the opposite direction to the other. The pressure relief valves 131 function to prevent the pressure from building up too high in either of the chambers 51, 52 (FIG. 3). When so configured, the piston 43 will be allowed to move as a result of forces applied by output control rod 35 if the pressure exceeds the limit of the pressure relief valves 131, in order to prevent a catastrophic failure and/or to provide a warning to the user. In the exemplary embodiment, the pressure relief valves 131 can be sized either to protect the components of the apparatus 30 itself, or linkages on the control rods 31, 35 and/or other input or output control components. Alternatively, the pressure relief valves 131 can be sized to provide feedback to the user when a certain feedback force is exceeded.

As noted above, a specific application for this back drive stop is in the control system of a rotor craft type aircraft. In addition to this apparatus 30, the aircraft would typically have some type of servo (such as an air cylinder) to provide a steady force to the control linkage.

In operation, as the rotor turns, there is an oscillatory feedback force to the control stick (cyclic). For a two-bladed rotor, this force can be approximated generally as:

$$F = A + B \sin \theta + C \sin 2\theta,$$

where A represents the average feedback, $B \sin \theta$ represents a 1 per rev (once per revolution) oscillation, and $C \sin 2\theta$ represents a two per rev (twice per revolution) oscillation. The average load, A, can be balanced with a servo (air cylinder), so that the only load on the control stick is the oscillatory one or two per rev load. Therefore, when the pilot (operator) wishes to move the control stick (e.g., cyclic) to control the plane of rotation of the rotor, at least once or twice during the rotation of the rotor, the output side, through the output control rod 35, will try to move in the direction of the input, through the input control rod 31, and the cyclic stick can be moved the desired amount. If the pilot (operator) cannot move the control stick far enough in the desired direction, then he can operate the servo (e.g., air cylinder) to provide the force needed to overcome the average load, A, on the control stick.

In this application, the pressure relief vavles 131 provide feedback to the pilot. Since the loads are oscillatory, this feedback is manifested in a 'bumping' when the loads get too high.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although described primarily with respect to an aircraft flight control system, the apparatus can be employed on any push pull type system where the object to be controlled may attempt to drive back its position.

That claimed is:

1. An apparatus for eliminating back drive in a push pull type control system, the apparatus comprising:
   a control rod including a rod end assembly comprising a pair of spaced apart piston displacement members, each piston displacement member having a check valve aperture configured to receive a check valve;
   a first check valve of a set of opposite-facing check valves having a body connected to a first of the pair of piston displacement members and having an aperture extending through a piston-facing surface of the first check valve for receiving hydraulic fluid; and
   a second check valve of the set of opposite-facing check valves having a body connected to a second of the pair of piston displacement members and having an aperture extending through a piston-facing surface of the second check valve for receiving hydraulic fluid;
   wherein the first check valve body is oriented so that when the first of the pair of piston displacement members is retracted into a direction of a piston head positioned between the set of opposite-facing check valves and the piston-facing surface of the first check valve lands upon an opposing surface of the piston head, the aperture of the first check valve forms an at least substantially sealed pathway through an aperture in the piston head; and
   wherein the second check valve body is oriented so that when the second of the pair of piston displacement members is extended into a direction of the piston head and the piston-facing surface of the second check valve lands upon an opposing surface of the piston head, the aperture in the second check valve forms an at least substantially sealed pathway through the second aperture in the piston head.

2. An apparatus as defined in claim 1, further comprising: a piston located within a chamber of a piston housing, the piston comprising a piston head and a piston body having inner surface portions defining a piston chamber configured to receive hydraulic fluid, the piston head including a first aperture for receiving a portion of the control rod, a first of the pair of piston displacement members located within the piston chamber and a second of the pair of piston engagement members located outside the piston chamber, the piston head further including a second aperture for passing portions of the hydraulic fluid into the piston chamber and for passing portions of the hydraulic fluid out of the piston chamber.

3. An apparatus as defined in claim 2, wherein the first and the second check valves are separated a sufficient distance so that when the respective piston-facing surface of one of the pair of opposite-facing check valves is in sealing contact with the piston head, the piston-facing surface of the other of the pair of opposite-facing check valves is separated from the piston head.

4. An apparatus as defined in claim 2, wherein the piston is operably coupled to an object to be controlled, and wherein the piston head and the first check valve are complementarily configured so that when the piston encounters forces emanating from the object that cause the piston to retract in the direction of the piston-facing surface of the first check valve and the corresponding opposing surface of the piston head sealingly engages the piston-facing surface of the first check valve, the sealing engagement of the opposing surface of the piston head with the first check valve causes a hydraulic lock that prevents further retraction of the piston head as a result of the forces emanating from the object to be controlled, thereby preventing back drive of the object to be controlled.

5. An apparatus as defined in claim 2, wherein the piston is operably coupled to an object to be controlled, and wherein the piston head and the second check valve are complementarily configured so that when the piston encounters forces emanating from the object to be controlled that cause the piston to extend in the direction of the piston-facing surface of the second check valve and the corresponding opposing surface of the piston head sealingly engages the piston-facing surface of the second check valve, the sealing engagement of the opposing surface of the piston head with the piston-facing surface of the second check valve causes a hydraulic lock that prevents further extension of the piston head as a result of the forces emanating from the object to be controlled, thereby preventing back drive of the object to be controlled.

6. An apparatus as defined in claim 2, further comprising a pair of centering springs positioned to maintain the piston head between the pair of opposite-facing check valves so that when no substantial external forces are applied to the piston or to the control rod, hydraulic fluid can flow into and out of the piston chamber through the second aperture of the piston head, effectively bypassing the check valves.

7. An apparatus as defined in claim 6, wherein a first of the pair of centering springs extends between a piston-facing outer surface portion of first piston displacement member and an opposing distal-facing outer surface portion of the piston head, and a second of the pair of centering springs extending between a piston-facing outer surface portion of the second piston displacement member and a proximal-facing outer surface portion of the piston head.

8. An apparatus as defined in claim 2, wherein the piston head includes a third aperture and fourth aperture, the apparatus further comprising:
   a first pressure relief valve having a body slidably positioned within the third aperture; and
   a second pressure relief valve having a body slidably positioned within the fourth aperture, the second pressure relief valve oriented to function in an opposite direction than that of the first pressure relief valve,
   the first and the second pressure relief valves together configured to prevent excessive pressure buildup on both proximal and distal facing sides of the piston head.

9. An apparatus as defined in claim 2,
   wherein the piston housing is a cylindrical housing having a first end portion, a second end portion, and a medial body portion extending therebetween, the medial body portion having an inner body surface defining a chamber containing hydraulic fluid, the first end portion configured to connect to a main aircraft structure;
   wherein the piston is slidably positioned within the chamber of the cylindrical housing and having an outer surface in sealed contact with inner surface portions of the medial body portion of the cylindrical housing;
   wherein the control rod is a first control rod extending from the second end of the housing and configured to be operably controlled by a user; and
   wherein the apparatus further comprises a second control rod connected to a piston tail section of the piston, extending from the first end portion of the housing, and configured to operably interface with the object to be controlled.

10. An apparatus for eliminating back drive in a push pull type control system, the apparatus comprising:
   a control rod including a rod end assembly comprising a pair of spaced apart piston displacement members, each piston displacement member having a check valve aperture configured to receive a check valve;
   a piston located within a chamber of a piston housing, the piston comprising a piston head and a piston body having inner surface portions defining a piston chamber configured to receive hydraulic fluid, the piston head including a first aperture for receiving a portion of the control rod, a first of the pair of piston displacement members located within the piston chamber and a second of the pair of piston engagement members located outside the piston chamber, the piston head further including a second aperture for passing portions of the hydraulic fluid into the piston chamber and for passing portions of the hydraulic fluid out of the piston chamber;
   a first check valve of a pair of opposite-facing check valves having a body connected to the first of the pair of piston displacement members and having an aperture extending through a piston-facing surface of the first check valve for receiving hydraulic fluid, the first check valve body oriented so that when the first of the pair of piston displacement members is retracted into a direction of the piston head and the piston-facing surface of the first check valve lands upon an opposing surface of the piston head, the aperture of the first check valve forms a sealed pathway through the second aperture in the piston head; and
   a second check valve of the pair of opposite-facing check valves having a body connected to the second of the pair of piston displacement members and having an aperture extending through a piston-facing surface of the second check valve for receiving hydraulic fluid, the second check valve body oriented so that when the second of the pair of piston displacement members is extended into a direction of the piston head and the piston-facing surface of the second check valve lands upon an opposing surface of the piston head, the aperture in the second check valve forms a sealed pathway through the second aperture in the piston head.

11. An apparatus as defined in claim 10, wherein the first and the second check valves are separated a sufficient distance so that when the respective piston-facing surface of one of the pair of opposite-facing check valves is in sealing contact with the piston head, the piston-facing surface of the other of the pair of opposite-facing check valves is separated from the piston head.

12. An apparatus as defined in claim 10, wherein the piston is operably coupled to an object to be controlled, and wherein the piston head and the first check valve are complementarily configured so that when the piston encounters forces emanating from the object that cause the piston to retract in the direction of the piston-facing surface of the first check valve and the corresponding opposing surface of the piston head sealingly engages the piston-facing surface of the first check valve, the sealing engagement of the opposing surface of the piston head with the first check valve causes a hydraulic lock that prevents further retraction of the piston head as a result of the forces emanating from the object to be controlled, thereby preventing back drive of the object to be controlled.

13. An apparatus as defined in claim 10, wherein the piston is operably coupled to an object to be controlled, and wherein the piston head and the second check valve are complementarily configured so that when the piston encounters forces emanating from the object to be controlled that cause the piston to extend in the direction of the piston-facing surface of the second check valve and the corresponding opposing surface of the piston head sealingly engages the piston-facing surface of the second check valve, the sealing engagement of the opposing surface of the piston head with the second check valve causes a hydraulic lock that prevents further extension of the piston head as a result of the forces emanating from the object to be controlled, thereby preventing back drive of the object to be controlled.

14. An apparatus as defined in claim 10, further comprising a pair of centering springs positioned to maintain the piston head between the pair of opposite-facing check valves so that when no substantial external forces are applied to the piston or to the control rod, hydraulic fluid can flow into and out of the piston chamber through the second aperture of the piston head, effectively bypassing the check valves.

15. An apparatus as defined in claim 14, wherein a first of the pair of centering springs extends between a piston-facing outer surface portion of first piston displacement member and an opposing distal-facing outer surface portion of the piston head, and a second of the pair of centering springs extending between a piston-facing outer surface portion of the second piston displacement member and a proximal-facing outer surface portion of the piston head.

16. An apparatus as defined in claim 10, wherein the piston head includes a third aperture and fourth aperture, the apparatus further comprising:
- a first pressure relief valve having a body slidably positioned within the third aperture and connected to the second of the pair of piston displacement members; and a second pressure relief valve having a body slidably positioned within the fourth aperture and connected to the first of the pair of piston displacement members, the second pressure relief valve oriented to function in an opposite direction than that of the first pressure relief valve,
- the first and the second pressure relief valves together configured to prevent excessive pressure buildup on both proximal and distal facing sides of the piston head.

17. An apparatus as defined in claim 10,
- wherein the piston housing is a cylindrical housing having a first end portion, a second end portion, and a medial body portion extending therebetween, the medial body portion having an inner body surface defining a chamber containing hydraulic fluid, the first end portion configured to connect to a main aircraft structure;
- wherein the piston is slidably positioned within the chamber of the cylindrical housing and having an outer surface in sealed contact with inner surface portions of the medial body portion of the cylindrical housing;
- wherein the control rod is a first control rod extending from the second end of the housing and configured to be operably controlled by a user; and
- wherein the apparatus further comprises a second control rod connected to a piston tail section of the piston, extending from the first end portion of the housing, and configured to operably interface with the object to be controlled.

18. An apparatus as defined in claim 10,
- wherein the push pull system is a push pull system for a rotary wing aircraft that provides pilot control to a rotor control head; and
- wherein the piston is operably coupled to the rotor control head via the push pull system.

19. An apparatus for eliminating back drive in a push pull type flight control system for an aircraft, the apparatus comprising:
- a cylindrical housing having a first end portion, a second end portion, and a medial body portion extending therebetween, the medial body portion having an inner body surface defining a housing chamber containing hydraulic fluid, the first end portion configured to connect to a main aircraft structure;
- a first control rod extending from the first end portion of the housing and configured to operably interface with a rotor control head; a second control rod extending from the second end of the housing and configured to be operably controlled by a user, the second control rod including a rod end assembly comprising a pair of spaced apart piston displacement plates, each piston displacement plate having a check valve aperture configured to support a check valve;
- a piston slidably positioned within the chamber of the cylindrical housing and having an outer surface in sealed contact with inner surface portions of the medial body portion of the cylindrical housing, the piston comprising a first end portion, a second end portion defining a piston head, and a medial body portion extending therebetween, the medial body portion defining a piston chamber containing portions of the hydraulic fluid, the piston head including a first aperture for receiving a portion of the second control rod, a first of the pair of piston displacement plates located within the piston chamber and a second of the pair of piston displacement plates located outside the piston chamber and inside the chamber of the cylindrical housing, the piston head further including a second aperture for passing portions of the hydraulic fluid into the piston chamber and for passing portions of the hydraulic fluid out of the piston chamber;
- a first check valve of a pair of opposing check valves having a body connected to the first of the pair of piston displacement plates and having an aperture extending through a piston-facing surface of the check valve for receiving hydraulic fluid, the first check valve body oriented so that when the first of the pair of piston displacement plates is retracted into a direction of the piston head and the piston-facing surface of the first check valve lands upon an opposing surface of the piston head, the aperture of the first check valve forms a sealed pathway through the second aperture in the piston head; and a second check valve of the pair of opposing check valves having a body connected to the second of the pair of piston displacement plates and having an aperture extending through a piston-facing surface of the check valve for receiving hydraulic fluid, the second check valve body oriented so that when the second of the pair of piston displacement plates is extended into a direction of the piston head and the piston-facing surface of the second check valve lands upon an opposing surface of the piston head, the aperture in the second check valve forms a sealed pathway through the second aperture in the piston head,
- the first and the second check valves being separated a sufficient distance so that when the respective piston-facing surface of one of the pair of opposing check valves is in sealing contact with the piston head, the piston-facing surface of the other of the pair of opposing check valves is separated from the piston head.

20. An apparatus as defined in claim 19,
- wherein the piston head separates the housing chamber into an input side chamber and an output side chamber;
- wherein when the piston-facing surface of the first check valve is in sealing contact with the piston head, hydraulic fluid cannot pass between the input side chamber and the output side chamber or pass out of the piston chamber; and
- wherein when the piston-facing surface of the second check valve is in sealing contact with the piston head, hydraulic fluid cannot pass between the input side chamber and the output side chamber or pass into of the piston chamber.

* * * * *